May 22, 1934.  C. O. PICARD  1,959,875
PLANT PROTECTOR
Filed Aug. 9, 1933
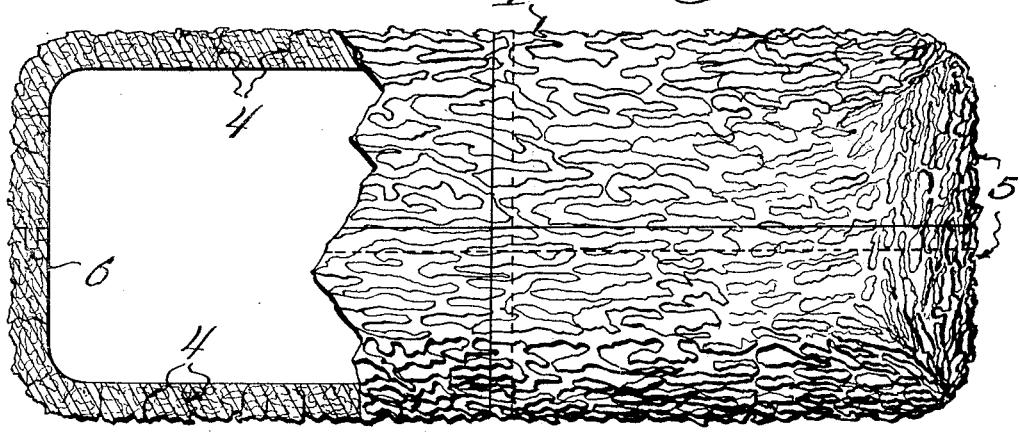
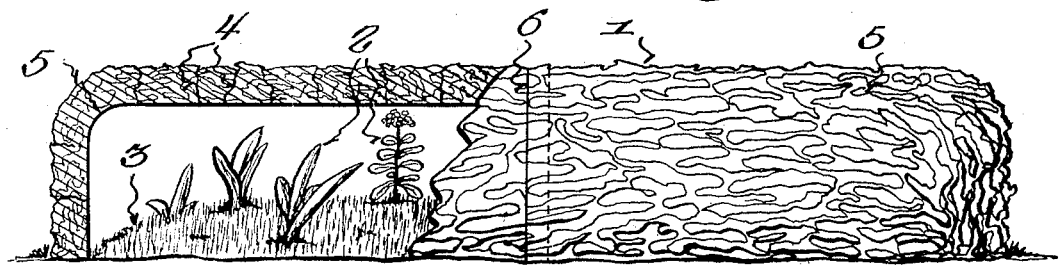
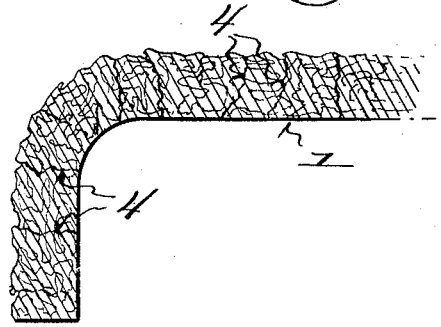

Patented May 22, 1934

1,959,875

UNITED STATES PATENT OFFICE 1,959,875

PLANT PROTECTOR

Clarence O. Picard, Milwaukee, Wis., assignor of one-half to Phillip Levine, Milwaukee, Wis.

Application August 9, 1933, Serial No. 684,384

3 Claims. (Cl. 47—28)

This invention pertains to plant protectors, and has primarily for its object to provide an exceedingly light, durable, and inexpensive shell or cover for growing vegetation to protect the same against frost, snow, and other detrimental elements, and at the same time maintain a condition most conducive to proper plant development and growth.

Incidental to the foregoing, a more specific object of the invention resides in the provision of an exceedingly light, rigid protective cover for plants, formed from moulded pulpous material, so coated or treated as to preserve the material for a prolonged period of time, and at the same time provide for sufficient passage of air to both protect the plants and promote their growth.

A still further object is to provide a shell having the foregoing characteristics, the outer surface of which can be formed to simulate grass, rocks, or other objects, thus adding materially to attractiveness in appearance.

With the above and other objects in view, which will appear as the description proceeds, the invention resides in the novel construction, combination and arrangement of parts, substantially as hereinafter described and more particularly defined by the appended claims, it being understood that such changes in the precise embodiment of the herein disclosed invention may be made as come within the scope of the claims.

In the accompanying drawing is illustrated one complete example of the physical embodiment of the present invention constructed according to the best mode so far devised for the practical application of the principles thereof.

Figure 1 is a plan view of a cover constructed in accordance with the present invention, the same being partially broken away and in section.

Figure 2 is a side elevation, partly broken away and in section, and showing the invention applied to a bed or grave mound.

Figure 3 is a fragmentary detail section of a portion of the shell to illustrate the minute fissures or crevices projecting therethrough to permit the passage of air.

While the present invention may be utilized wherever it is desired to protect plant life against frost, snow, and other harmful elements, the same is particularly desirable for protecting plants and flowers in beds or upon graves, due to the fact that the shell is formed from extremely light, inexpensive material of sufficient rigidity to permit the same to be formed of substantial dimensions and yet easily handled.

Referring now more particularly to the present invention, wherein the form of the invention illustrated is particularly designed for use in connection with a grave mound, the numeral 1 designates a shell of rectangular shape, and of sufficient height to accommodate the usual plants or flowers 2 used for decoration of the grave mount 3. The dimensions of the shell are such as to permit the same to straddle the mound 3, and rest in intimate contact with the ground adjacent the sides of the mound.

The shell 1 is preferably formed from moulded flocculent or pulpous material, such as wood fibre, papier mâché, or the like, which is inexpensive, light, and yet of sufficient rigidity to withstand exposure to the elements.

While the shell 1 may be moulded or cast in any suitable manner, one desirable method is to apply the pulpous material in a coating over a form of the desired shape and dimensions, thus providing a roughened outer surface, which, when colored, can be readily made to simulate grass, rocks, or numerous other objects, materially adding to the attractive appearance of the shell. Furthermore, in forming the shell as explained, the material in its pulpous state is free and under no compression, which causes the same to dry and harden with numerous minute fissures or crevices 4 extending through the wall of the shell and substantially uniformly spaced.

Thus, in use a certain amount of oxygen or air is permitted to pass through the shell to maintain the desired condition essential to the development and growth of the plants or flowers covered thereby. At the same time it is to be understood that the crevices 4 are so minute as to exclude frost and protect the plants against frost, snow, and excessive moisture.

Further, in the use of the present invention, the plants require practically no attention, such as watering, in that the shell retains moisture in the earth for a prolonged period of time.

In order to preserve the pulpous material from which the shell is formed, the same will be either treated or coated with a suitable solution, such as rosin, gum, or bituminous material. Obviously, the preservative material may be either mixed with the pulpous material, or impregnated thereing by coating the shell after the same has been formed.

From the foregoing explanation, considered in connection with the accompanying drawing, it will be readily seen that an exceedingly simple, light, and inexpensive covering has been provided, which can be formed in substantial dimensions and yet easily handled.

For convenience in handling, shipping, and storing, in some instances the shell 1 may be formed in a plurality of sections 5 having interlocking engagement, such as tongues and grooves 6. In the structure illustrated, obviously the sections may be nested, thus forming a compact arrangement for shipping or storage.

I claim:—

1. A plant protector for grave mounds comprising a rectangular shell adapted to straddle the mound and rest upon the ground adjacent the sides thereof, said shell being formed from moulded pulpous material having minute crevices extending therethrough to permit the passage of air, and being treated with a preservative solution to protect the same against moisture.

2. A plant protector comprising a shell formed from moulded pulpous material, and having minute crevices extending therethrough to permit the passage of air, said shell being formed in a plurality of sections having interlocking engagement.

3. A plant protector comprising a shell formed from moulded pulpous material treated with a preservative and having minute crevices extending therethrough to permit the passage of air, said shell being formed in a plurality of sections having interlocking engagement, and having an exterior roughened surface to simulate vegetation, or other objects.

CLARENCE O. PICARD.